United States Patent
Grable et al.

(10) Patent No.: US 8,197,001 B2
(45) Date of Patent: Jun. 12, 2012

(54) PIVOTING HEADREST FOR USE IN A REAR ROW SEAT AND INCORPORATING TRIGGER RELEASE WITH CABLE SLACK PICKUP DURING SEATBACK ROTATION TO A FORWARD DUMP POSITION

(75) Inventors: David Grable, Clinton Township, MI (US); Stephen Bruck, Howell, MI (US); Jason Hamilton, Highland, MI (US); David L. Quittschreiber, Milford, MI (US)

(73) Assignee: BAE Industries, Inc., Warren, MI (US)

( * ) Notice: Subject to any disclaimer, the term of this patent is extended or adjusted under 35 U.S.C. 154(b) by 288 days.

(21) Appl. No.: 12/643,302

(22) Filed: Dec. 21, 2009

(65) Prior Publication Data

US 2011/0148170 A1    Jun. 23, 2011

(51) Int. Cl.
*A47C 1/02* (2006.01)
*B60N 2/48* (2006.01)

(52) U.S. Cl. .................. 297/61; 297/378.1
(58) Field of Classification Search .............. 297/408, 297/61, 378.1
See application file for complete search history.

(56) References Cited

U.S. PATENT DOCUMENTS

| | | | |
|---|---|---|---|
| 5,681,079 A | 10/1997 | Robinson | |
| 5,826,942 A | 10/1998 | Sutton et al. | |
| 6,050,633 A * | 4/2000 | Droual | 297/61 |
| 6,485,096 B1 * | 11/2002 | Azar et al. | 297/61 |
| 6,860,564 B2 | 3/2005 | Reed et al. | |
| 7,044,555 B2 | 5/2006 | Saberan | |
| 7,185,950 B2 | 3/2007 | Pettersson et al. | |
| 7,237,843 B2 | 7/2007 | Clark et al. | |
| 7,322,646 B2 | 1/2008 | Jammalamadaka et al. | |
| 7,325,877 B2 * | 2/2008 | Brockman et al. | 297/408 |
| 7,478,860 B2 | 1/2009 | Lawall et al. | |
| 2002/0079723 A1 | 6/2002 | Risch et al. | |
| 2005/0067874 A1 | 3/2005 | Kamrath et al. | |
| 2005/0179301 A1 | 8/2005 | Clark et al. | |
| 2006/0163930 A1 | 7/2006 | Pettersson et al. | |
| 2007/0062324 A1 | 3/2007 | Ingraham | |
| 2008/0284226 A1 | 11/2008 | Brunner et al. | |
| 2009/0179457 A1 | 7/2009 | Platto et al. | |
| 2009/0184555 A1 | 7/2009 | Yetukuri et al. | |
| 2010/0013275 A1 * | 1/2010 | Yokota et al. | 297/61 |
| 2010/0078972 A1 * | 4/2010 | Sayama | 297/61 |

* cited by examiner

*Primary Examiner* — Milton Nelson, Jr.
(74) *Attorney, Agent, or Firm* — Gifford, Krass, Sprinkle, Anderson & Citkowski, P.C.

(57) ABSTRACT

A pivoting headrest assembly incorporated into a rear row vehicle seat including a base and a pivotally supported seatback. A first bracket is fixedly supported atop the seatback and exhibits a striker. A second bracket is pivotally supported to the first bracket in a biased direction away from the striker and includes a headrest bun support. A hook is supported upon the second bracket in a first biased direction engaging the striker. A release element associated with the second bracket is biased direction and which, upon being actuated in a second counter-biased direction, engages a projecting portion associated with the hook. A cable is secured at a first end to a fixed location associated with the seat and extends through a redirection location an offset distance from a pivot location of the seatback, the cable securing at a second end to the release element.

14 Claims, 12 Drawing Sheets

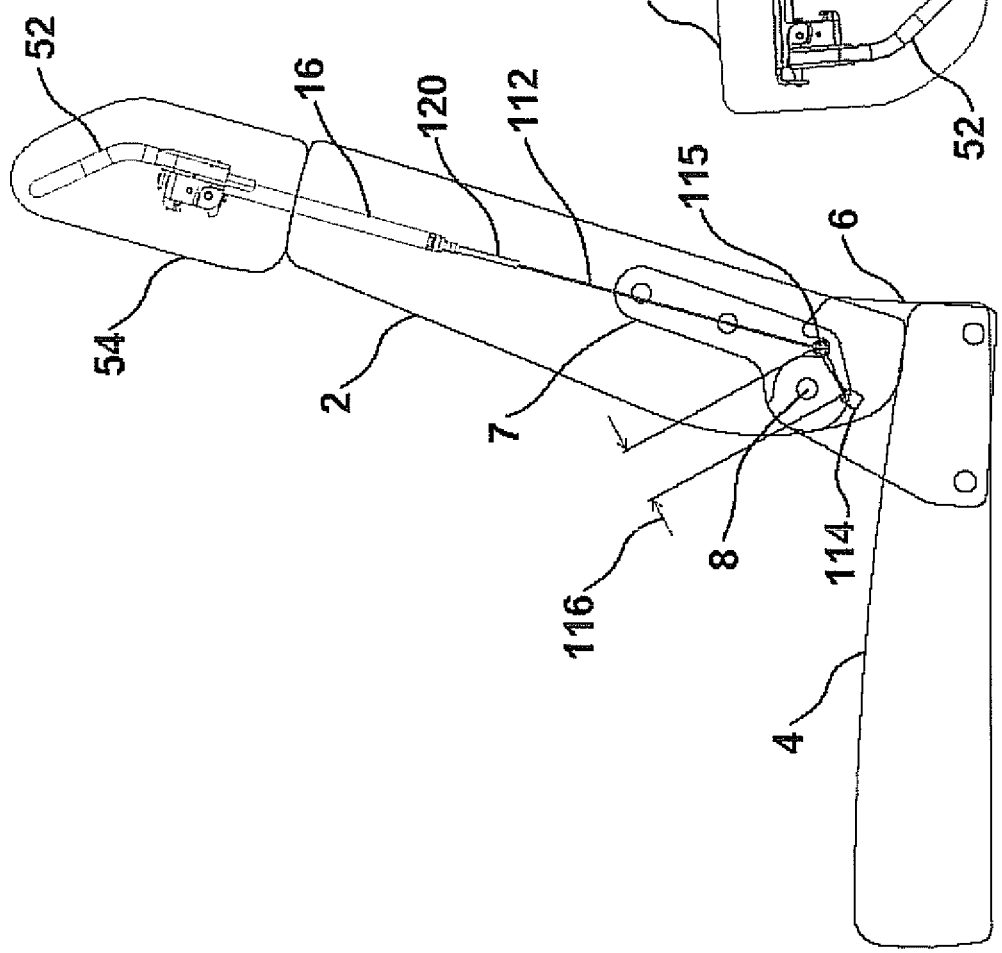
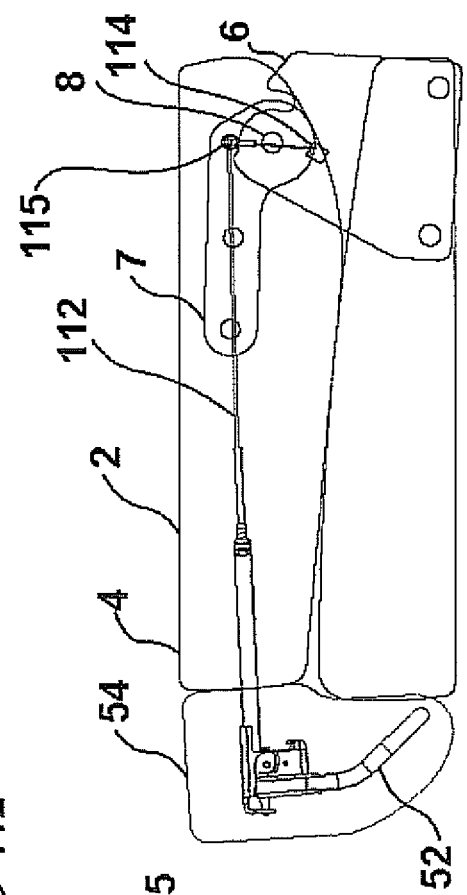

PIVOTING HEADREST FOR USE IN A REAR ROW SEAT AND INCORPORATING TRIGGER RELEASE WITH CABLE SLACK PICKUP DURING SEATBACK ROTATION TO A FORWARD DUMP POSITION

FIELD OF THE INVENTION

The present invention relates generally to a pivoting headrest assembly, such as for use with a rear row vehicle seatback assembly. More specifically, the present invention teaches a pivoting headrest which is selectively manually released or automatically triggered for timed release via a cable arrangement disposed in offset fashion relative to a pivot connection established between the rotating seatback and such as in order to established timed release of the headrest during the forward dumping cycle of the seatback.

BACKGROUND OF THE INVENTION

The present invention is documented with various types of pivoting headrest devices, such as for use in a motor vehicle. Such headrest designs can include either or both of manual triggered or automatic release of the headrest.

U.S. Pat. No. 5,681,079 to Robinson teaches a headrest folding apparatus in which a latch release mechanism is employed permitting angular movement of the headrest from a normal use position to a dumped position. Of note, a movement coordinate mechanism is operative for causing, movement of the headrest to the dump position and in response to movement of the seatback panel to the forward fold flat position. The latch release mechanism interconnects the headrest latch to the seatback latch and is released upon the seatback latch being actuated for unlatching the seatback panel.

U.S. Pat. No. 5,826,942, to Sutton, teaches a vehicle seat assembly in which a linkage arm 36 connects a pivot 34 associated with a headrest 24 to a seatback release latch 32. The Pettersson publication 2006/0163930 and subsequent U.S. Pat. No. 7,185,950 further teaches a head restraint system with a notable cable and wheel supported arrangement for timing headrest release (see FIGS. 1 and 2).

A problem associated with the prior art concerns take up issues resulting from the inevitable slack established in the cable extending from a lower frame supporting location associated with the rotating seatback to an upper location at which it triggers release of the headrest. Absent corrective action, inevitable slack in the cable resulting from the forward rotating (or dumping) motion of the seat can cause jamming or other problems in the proper functioning of the headrest, such as during subsequent reverse rotating and retriggering to an upright design position.

SUMMARY OF THE INVENTION

The present invention discloses a headrest design which can be mounted to facilitate either forward or rearward headrest folding. More particularly, the headrest incorporates a seatback cable induced trigger release, and in which the cable translated through a redirection location an offset distance from an associated seatback pivot point and, upon engaging, triggers initial seatback dump with timed headrest pivot in order to avoid contacting the forward located seatback upon completion of the seatback dump.

The headrest mechanism further incorporates a rotating and trigger induced release wheel to which the cable is connected. Rotating of the wheel initiates lateral translation of a release plate incorporated into a pivotally mounted bun supporting bracket and which is engageable to or releasable from a vertical striker portion associated with the statically mounted and headrest rod supported base bracket. Cable slack resulting from the offset alignment established between the seatback pivot location and the lower frame supporting and redirecting location, the configuration of the rotating trigger/take up wheel capable of being designed to initiate any timed release of the rotating headrest relative to the forward dumping sequence of the seat back and between upright design and forward dumped positions.

The mechanism includes a first bracket which is fixedly supported atop the seatback and exhibits a striker. A second bracket is pivotally supported to the first bracket in a biased direction away from the striker and includes a headrest bun support. A hook is supported upon the second bracket in a first biased direction engaging the striker.

A release element associated with the second bracket is biased direction and which, upon being actuated in a second counter-biased direction, engages a projecting portion associated with the hook. A cable is secured at a first end to a fixed location associated with the seat and extends through a redirection location an offset distance from a pivot location of the seatback, the cable securing at a second end to the release element.

Upon the seatback being pivoted relative to the fixed location, translation of the cable around the redirection location results in actuation of the release element to separate the hook from the striker and the second bracket to pivot away from the first bracket. A return bias of the release element results in take-up of slack in the cable, concurrent with return pivoting of the second bracket into engagement with the striker.

Additional features include the hook exhibiting an interiorly apertured profile formed within a laterally displaceable and generally elongated plate supported against an underside of a width projecting ledge associated with the second bracket, the projecting portion extending downwardly from said plate. The plate further exhibits a pair of spaced apart and collinear extending slots defined therein and through which seats a pair of pins extending from the ledge. An edge projecting portion associated with the plate extends through a side aperture defined in the second bracket and which operates as a secondary and manually actuated release trigger independent from the actuating rotation of the seatback for pivoting the second bracket. The release element also includes a generally wheel shaped and rotatable component supported upon a surface of the second bracket extending normal to the ledge.

Other features include an outwardly facing perimeter channel defined in the wheel seating the second end of the cable in winding fashion. A substantially semi-circular shaped projecting collar extends from an edge perimeter of the rotatable component and, upon the translating cable rotating the component, causes the collar to contact the projecting portion to laterally displace the plate against the bias.

A clock spring is supported upon a pivot pin established between the first and second brackets and has a first extending end biasing a surface location of the first bracket and a second extending end biasing a rivet secured to a side extending surface of the second bracket at a pivot offset location. A coil spring is provided and includes a first extending end secured to the laterally displaceable plate and a second extending end secured to the second bracket. A modified clock spring seats over a support rivet associated with the rotatable component and includes a first inner curled end seating within a keyed location of the rivet and a second outer extending end seating within an aperture formed in a surface of the rotatable component.

Other features include a pair of support tubes extending upwardly from the seatback and support the first bracket therebetween, a pair of upper and lower flanges extending normally from the first bracket and supporting the striker in extending fashion therebetween. The first bracket also includes a pair of pivotal supporting sides, the second bracket having a pair of extending and overlapping pivotal supporting sides which align over the sides of the first bracket, the pivot pin extending through a first pivotal aligning side, and with a secondary pivot pin extending through a second pivotal aligning side. The cable also extends through a hollow interior of a selected support tube prior to securing to the release element.

BRIEF DESCRIPTION OF THE DRAWINGS

Reference will now be made to the attached drawings, when read in combination with the following detailed description, wherein like reference numerals refer to like parts throughout the several views, and in which:

FIG. 5 illustrates an upright design position of a seat incorporating the headrest assembly;

FIG. 6 is a succeeding illustration of seat in which the seatback is rotated to a forward dump position concurrent with cable triggered release of the headrest causing likewise forward rotation to a non-use stow position;

DETAILED DESCRIPTION OF THE PREFERRED EMBODIMENTS

Figure 1:
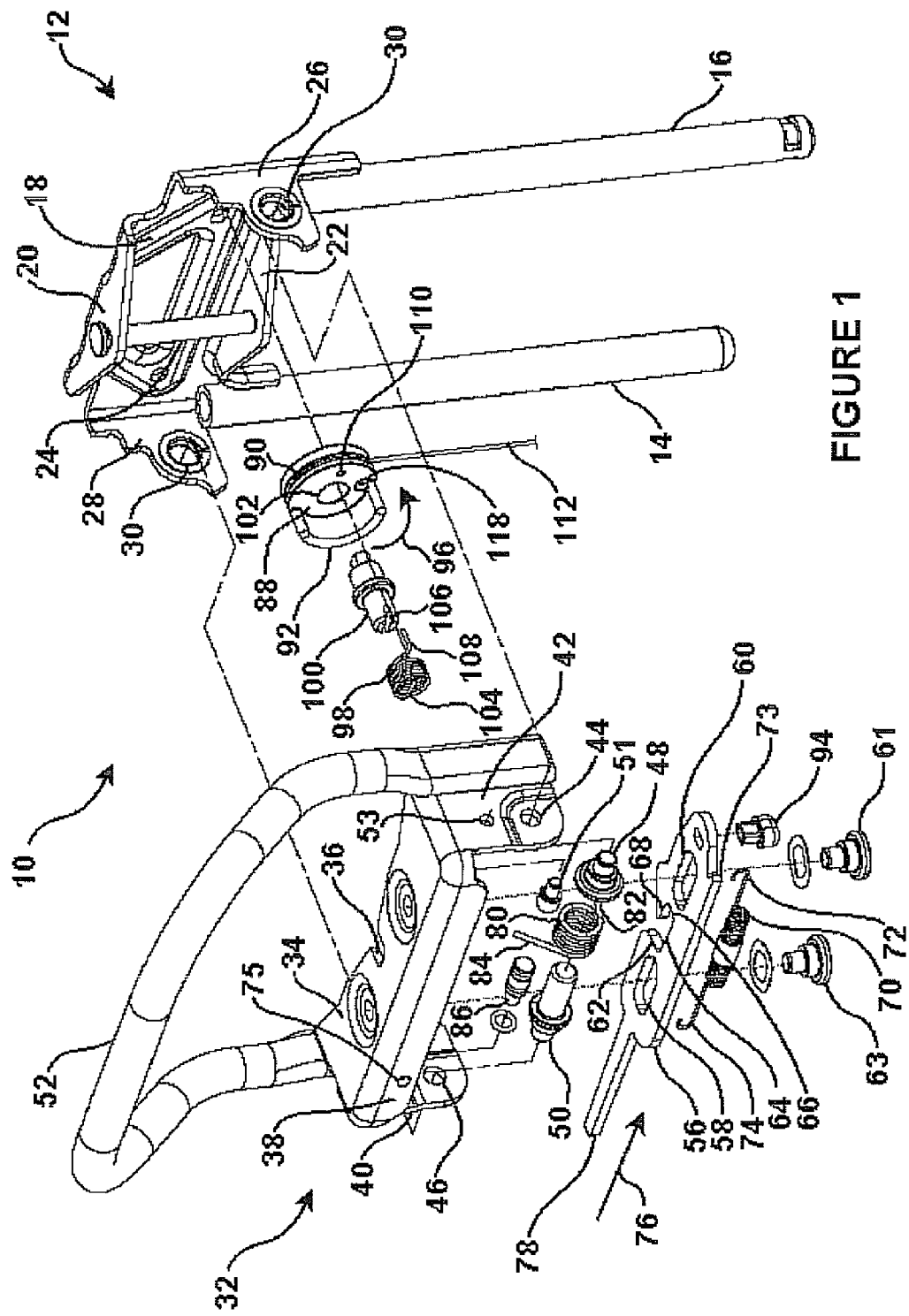
FIG. 1 is an exploded view of the headrest assembly according to the present invention.

With reference to FIG. 1, and each of succeeding views FIGS. 2-13, the present invention discloses a headrest design, generally shown at 10, and which can be mounted to facilitate either forward or rearward headrest folding. The present invention is an improvement over prior art headrest designs in that it prevents the incidence of jamming or kinking of the associated release cable, due again to the pivotal offset relationship established between the redirection axis of the cable and the pivot location of the seatback, this offset inevitably resulting in lengthening of the cable during forward folding of the seatback and concurrent pivoting of the upper mounted headrest.

As will further described, the headrest assembly is subject to a wide variety of varying structures and operating protocol for establishing a desired and timed trigger release of the headrest, such as occurring automatically by virtue of the pulling action exerted by the cable during initial forward dumping rotation of the seatback, and in order to rotate the headrest to the desired stowed position. Unless otherwise indicated, the various structural components associated with the headrest assembly (with the general exception of the rotating trigger release wheel) are typically constructed of a suitable SAE grade steel material exhibiting the necessary features of strength and durability.

The mechanism includes a first bracket (generally shown at 12 in the exploded view of FIG. 1) which is fixedly supported atop a conventional seatback 2 (see FIGS. 5 and 6), in turn incorporated into such as a rear row seat and which is pivotally supported atop a seat bottom or base 4. As further shown in the side operational views of FIGS. 5 and 6, a pair of opposite side brackets (see as shown by selected lower bracket 6 fixed to the seat base 4 and upper pivotal bracket 7 secured to the seat back 2) define part of the seat frame and collectively secure the seat back 2 to the base 4 via side pivot locations 8.

The first bracket 12 includes a pair of vertically extending support tubes 14 and 16 which embed within the seat back 2 and terminate at an upper end in a support location a spaced and elevated distance above the top of the seatback 2. The elevated support location includes a base surface 18 and a pair of upper and lower forwardly projecting flanges 20 and 22 supporting therebetween a forwardly spaced and vertically extending striker 24. A pair of angled and forwardly projecting side flanges 26 and 28 are provided, these extending in a similar direction as the upper and lower flanges 20 and 22 supporting the vertical striker 24 and, in combination with a pair of bushings 30 installed over aligning side apertures defined in the side flanges 26 and 28, establish pivotal support locations associated with the first bracket 12, the purpose for which to be subsequently described.

A second bracket (generally shown at 32 in FIG. 1) is provided and includes a pivotally supporting base portion including a width projecting ledge 34, within which is defined a forward facing notch or recess 36 in generally aligning fashion with the location of the vertically extending striker 24 associated with the first bracket 12. An underside of the ledge 34 is further defined by a widthwise extending end skirt 38, this joining at opposite ends with a pair of extending sides 40 and 42.

A pair of side apertures are defined by inner extending circular profiles 44 and 46 defined in the second sides 40 and 42 and which, upon aligning in outwardly overlapping fashion relative to the inner aligning sides 26 and 28 associated with the first bracket 12, receive a pair of pins 48 and 50 in order to pivotally mount the second bracket 32 to the first and seatback supported bracket 12. A pin 51 is mounted at an offset location relative to the pin 48 (through an inner aperture 53) and is configured to abut an upper configured step profile 55 associated with the overlapping side 26 (see both FIGS. 1 and 7) of the first bracket 12 and to thereby establish an uppermost design engaging portion of the second pivotal bracket 32 relative to the fixed first bracket 12. An upwardly extending and arcuate profile 52 is shown and which secures at opposite ends to the sides established by the second bracket 32. A headrest bun, see at 54 in FIGS. 5 and 6, is supported upon the extending profile 52.

A laterally displaceable and generally width extending/elongated plate 56 is provided and is mounted to an underside of the width extending ledge 34 associated with the second bracket 12. A pair of spaced apart and collinear slots 58 and 60 are defined in the plate 56. A pair of support pins 61 and 63 seat through the slots 58 and 60 and secure to the underside of the width extending ledge 34 in order to permit the plate 56 to laterally displace a selected distance in each of opposite directions.

An edge of the plate 56 is interiorly configured by a series of interconnected and inner angled surfaces 62, 64, 66 and 68 (again FIG. 1) in order to define a generally hook shaped recess which, upon being secured to the ledge underside, is positioned in generally lateral bi-directional displaceable fashion relative to the inwardly defined notch 36. A coil spring 70 is provided and includes a first extending end 72 secured to edge projection 73 in the laterally displaceable plate 56, an opposite second extending end 74 secured to a support location (aperture 75) associated with the skirt 38 of the second bracket 32, and so that the plate 56 with interiorly configured hook is biased in a first lateral direction (see arrow 76) which causes the interiorly configured hook to engage the vertical striker 24, upon the same being seated within the notched recess 36 associated with the second bracket 32.

Figure 7:
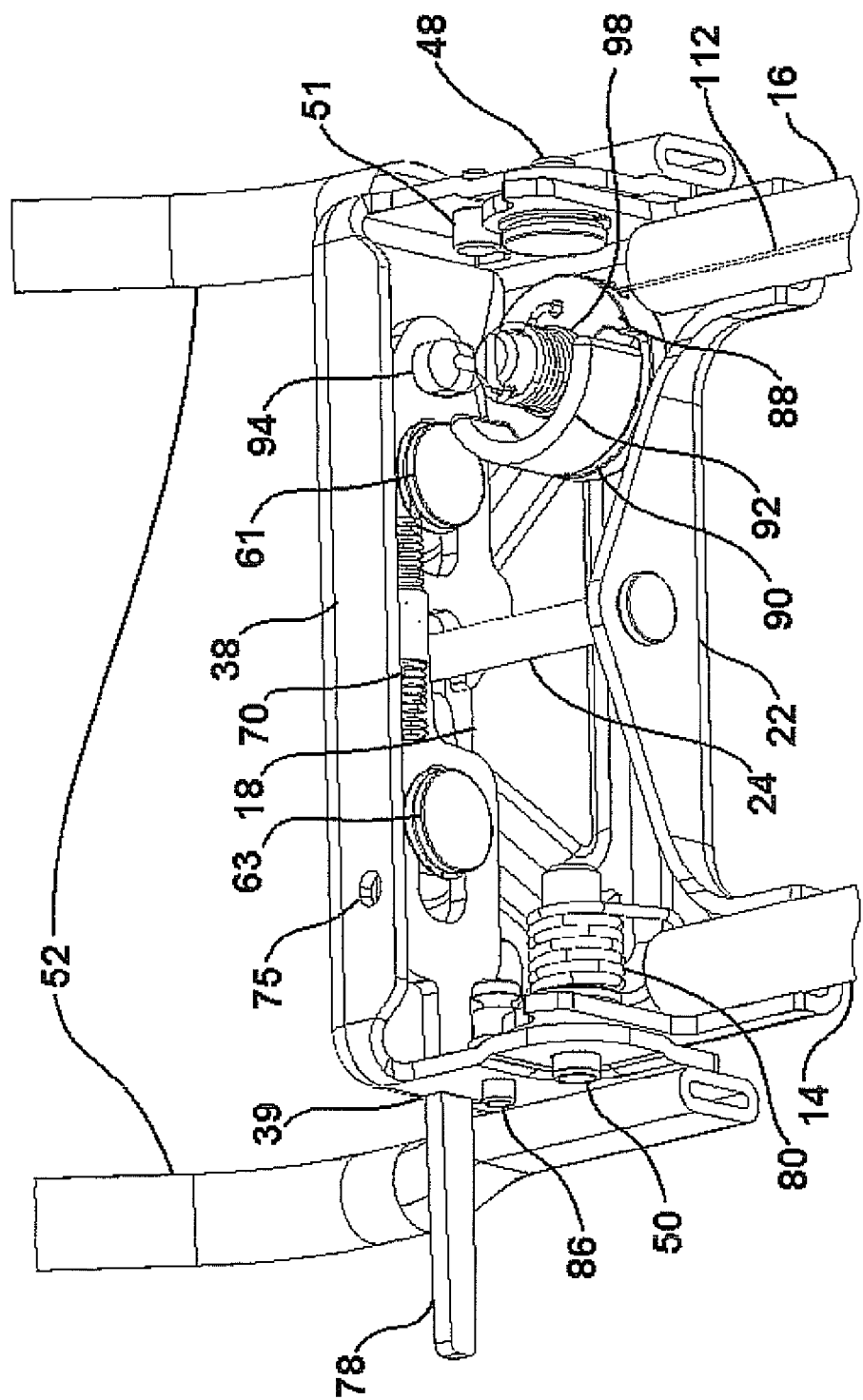
FIG. 7 is a sectional perspective of the headrest in an initial design or use position.
Figure 8:
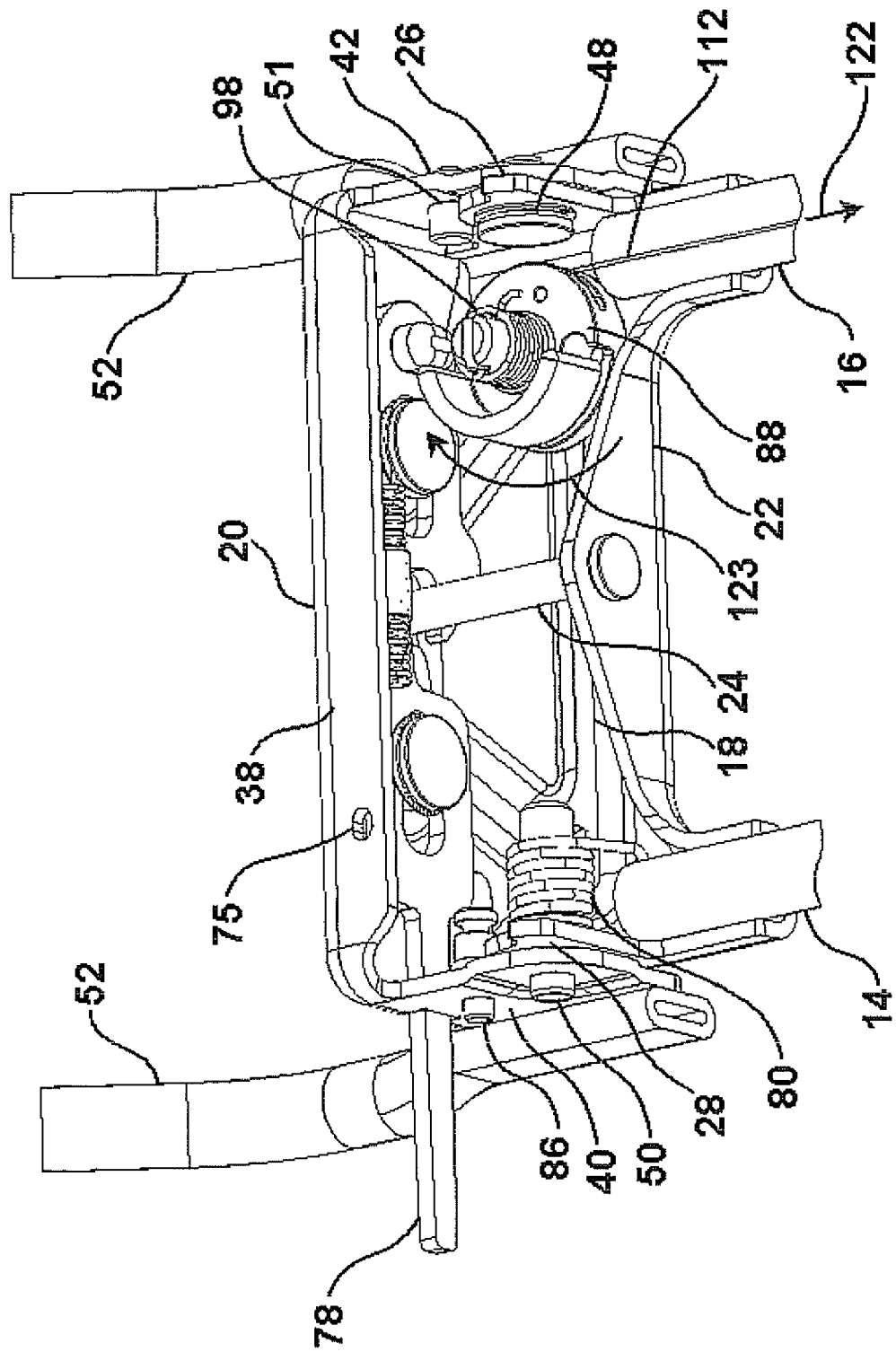
FIG. 8 is a succeeding illustration in which the cable actuated and rotating release/take up wheel establishes an initial contact position with a projecting underside portion associated with a hook portion incorporated into the laterally translatable release plate associated with the pivoting headrest bracket.
Figure 9:
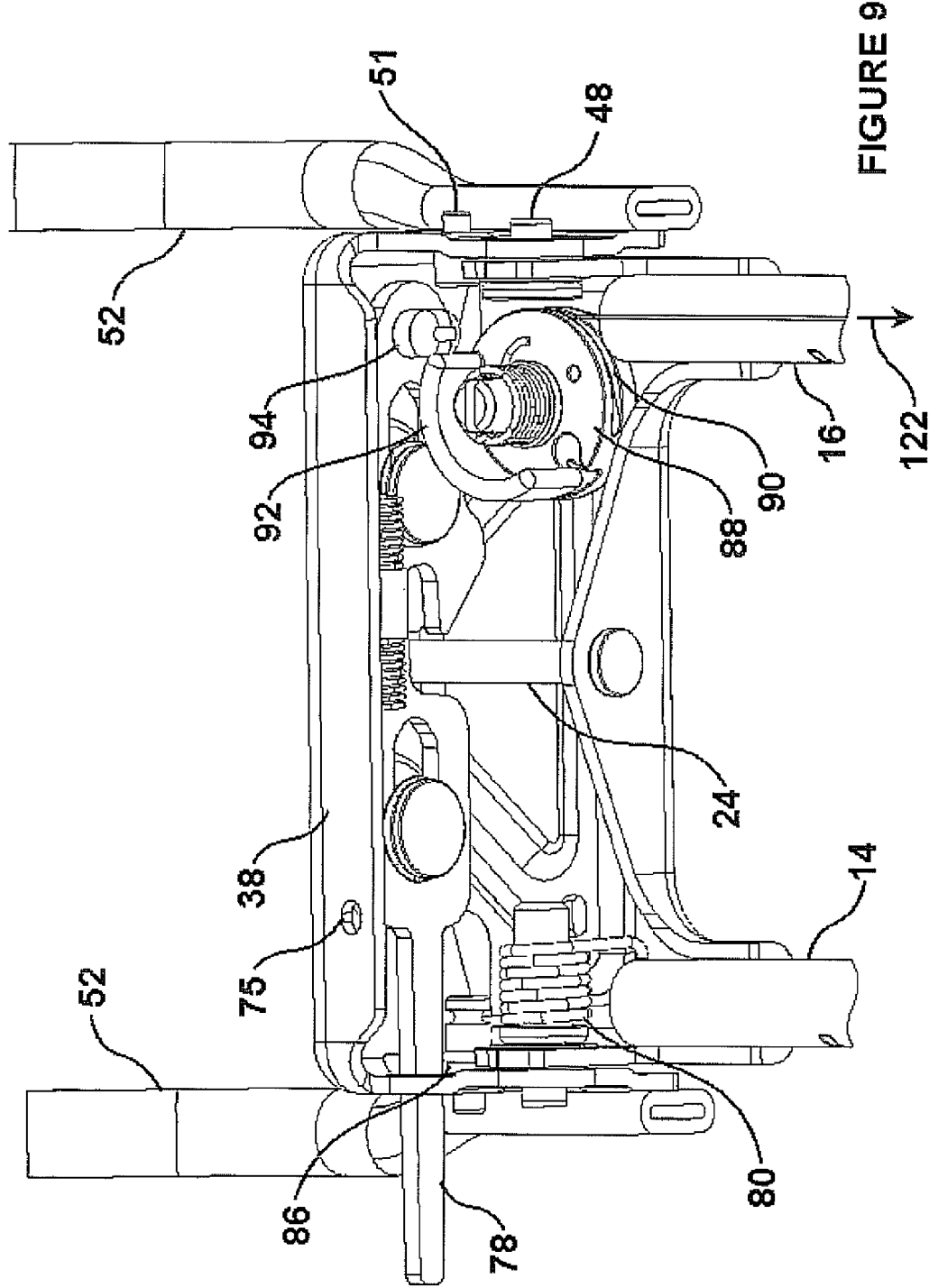
FIG. 9 is a further succeeding illustration in which the release plate is laterally translated a sufficient distance for releasing from a vertical striker portion associated with the statically mounted and headrest rod supported base bracket.

Also shown is an edge projecting portion 78 associated with the plate 56 and extending through an aperture defined by an inner profile 79 (see as shown in FIG. 7 et seq.) in the associated side 40 of the second bracket 32. The projecting portion 78 is capable of being linearly displaced (by pulling) in a direction opposite that of the lateral bias 76, thereby causing the plate 56 to exert laterally against the holding forces of the coil spring 70 and to unseat from the striker 24 to permit the second bracket 32 to pivotally rotated away from the first bracket 12 via the biasing forces exerted by a spring 80 supported upon selected pivot pin 50, with a first end 82 biasing a surface location of the first bracket 12 and a second extending end 84 biasing a rivet 86 secured to the side extending surface 40 at a pivot offset location. As such, the manual trigger feature provided by the integral formed and lateral extending portion 78 provide triggering of the headrest assembly independently of the automatic triggering features established by the forward pivoting of the seatback 2 and as will be subsequently described.

A release element is associated with the second bracket 12 and includes a generally wheel shaped and rotatable component 88, such as which is constructed of a durable nylon or like material and which is supported upon an inner facing location of the skirt extending surface 18 and in a manner extending in a normal (i.e. generally perpendicular) direction relative to the upper ledge 34. An outwardly facing perimeter channel 90 is defined in the rotatable wheel 88 (this seating the second extending end of the triggering cable as will be subsequently described).

A substantially semi-circular shaped and projecting collar 92 is also provided and which extends a selected distance from an arcuate edge perimeter of the rotatable component 88 (again FIG. 1). Upon rotating of the component 88 in the manner to be subsequently described in reference to the views of FIGS. 7-9, an edge of the collar 92 engages an underside projection 94 (see FIG. 7) associated with an edge of the laterally displaceable plate 56 and in order to trigger the hook release feature of the plate independently from the manual release trigger feature provided by the integral and lateral edge extending portion 78.

A counter clockwise bias (see arrow 96) is exerted upon the rotatable wheel 88 by a modified spring 98 seated over a support rivet 100 extending through an open inner aperture 102 of the wheel 88 and mounting the same to the inner facing surface of the skirt 38 of the second bracket. The spring 98 includes a first inner curled end 104 seating within a keyed location 106 of the rivet 100, with a second outer extending and opposite end 108 seating within an aperture 110 formed in an inner surface of the rotatable wheel component 88. In this fashion, and absent a reverse biasing force (acting against the counter clockwise inducing force 96) the rotating wheel component 88 is prevented from rotating and laterally actuating the underside projection 94 of the plate 56 to thereby trigger pivotal release of the second bracket 32.

Figure 2:
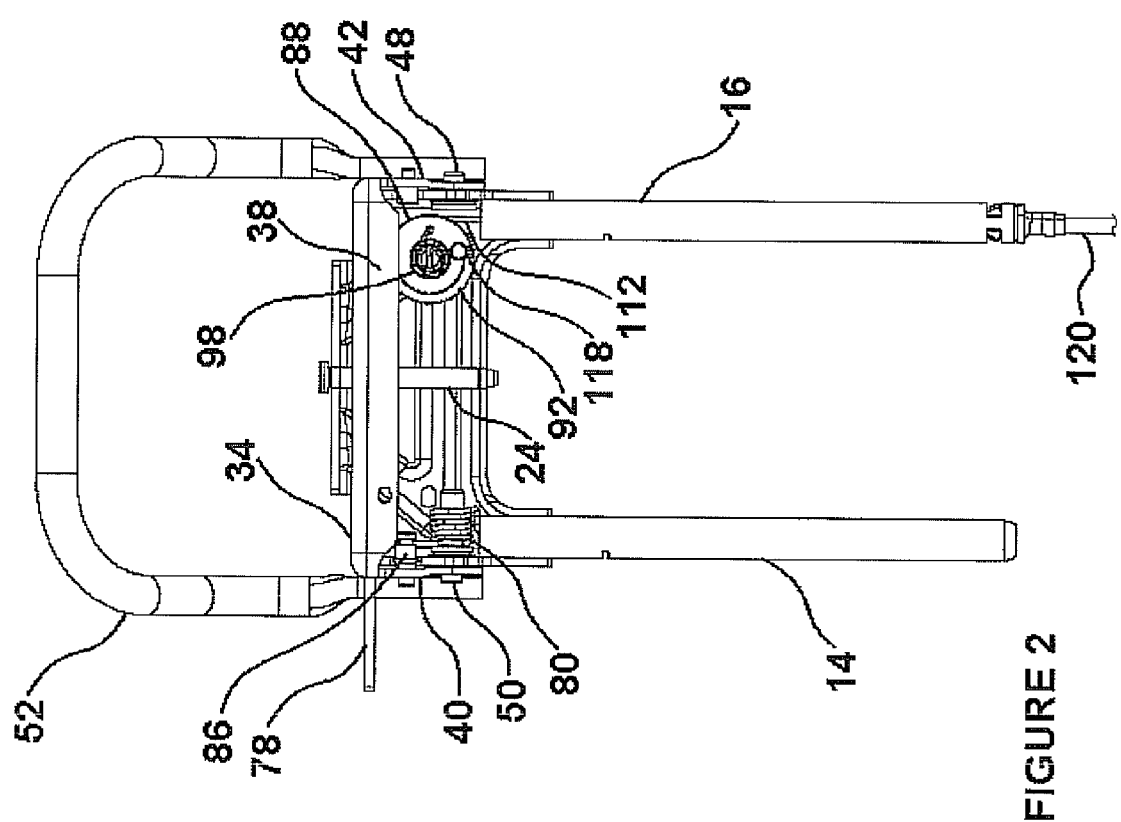
FIG. 2 is a front assembled view of the headrest shown in FIG. 1.
Figure 3:
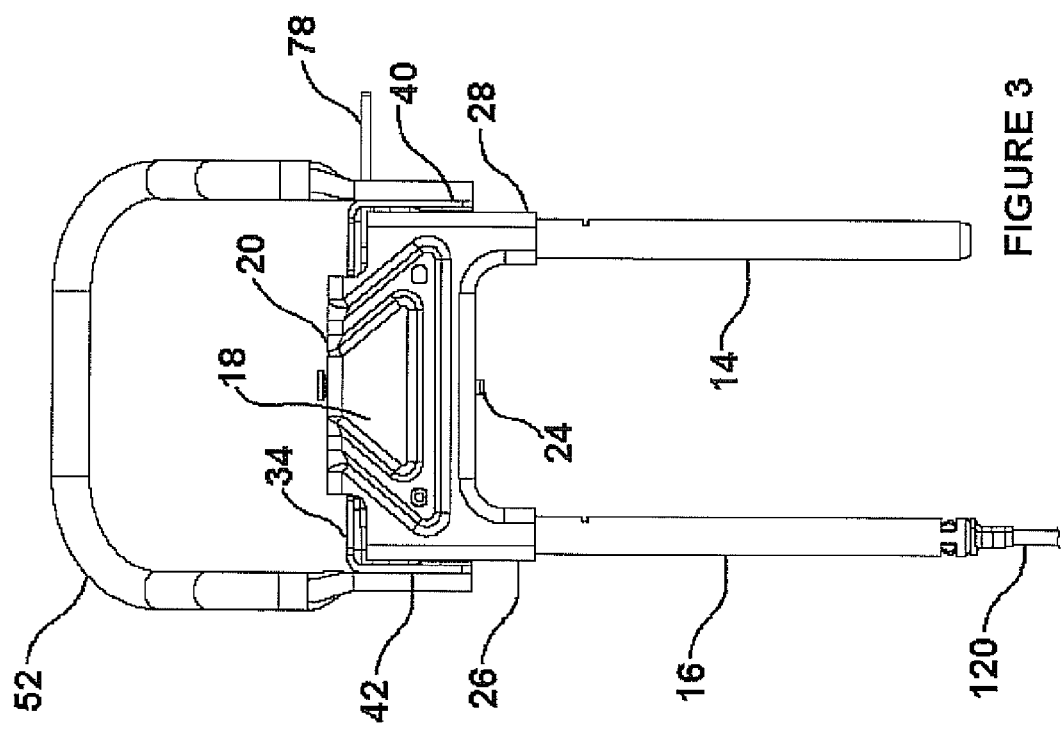
FIG. 3 is a rotated rear assembled view.
Figure 4:
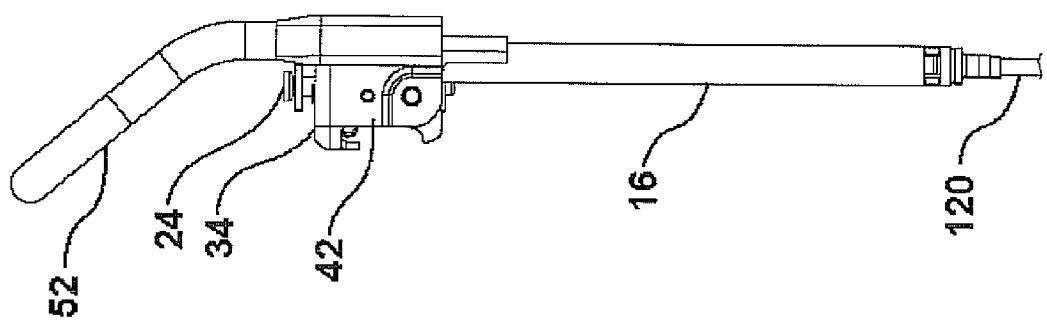
FIG. 4 is a right side view of the headrest.

Referring again to the operational side views of FIGS. 5 and 6 in combination with the exploded view of FIG. 1 and the front assembly view of FIG. 2, a cable 112 is provided and which is secured at a first end 114 (again FIGS. 5 and 6) to a fixed location associated with the lower side frame supports 6 of the seat bottom. The cable 112 extends through a redirection location 115 an offset distance (see at 116 in FIG. 5) from the pivot location 8 of the seatback 2 supported upper frame 7 relative to the lower frame 6.

As further not clearly shown, the cable 112 is understood in one non-limiting embodiment to travel interiorly within the seatback and sot that it secures at a second end 118 (again FIGS. 1 and 2) in seating and supported fashion within the exterior perimeter recess 90 established within the wheel release component 88. As further shown in reference to FIGS. 2 and 5 collectively, the cable 112 is shown extending through an outer sleeve 120 which is supported upon a lower end of the hollow interior tube 16, the cable 112 further extending within the tube 16 and, exiting through the top in order to secure to the proximately located wheel component 88.

As described with reference to the side views of FIG. 5 (upper design) and FIG. 6 (forward dump), and with concurrent reference to FIGS. 7-13 in succession (these augmenting the exploded illustration of FIG. 1 without repeating for sake of convenience of illustration each and every feature previously described), automatic triggering of the headrest (again independently of the manual release trigger feature previously described) is initiated by separate forward rotating release of the seatback 2 (such as by a separate latch or trigger mechanism not described herein). At this point, forward pivoting or rotation of the seatback 2 causes the cable 112, by virtue of its offset arrangement (again distance 116) relative to the side frame pivot connection 8, to exert a downward pulling force (see arrow 122 in FIGS. 8 and 9) on the wheel component 88 at its upper and second mounted end. This in turn causes the wheeled component 88 to rotate counter to the biasing forces exerted by its holding spring and such that the end of the projecting collar 92 initially makes contact with and subsequently laterally displaces the underside projection 94 of the plate 56.

Figure 10:
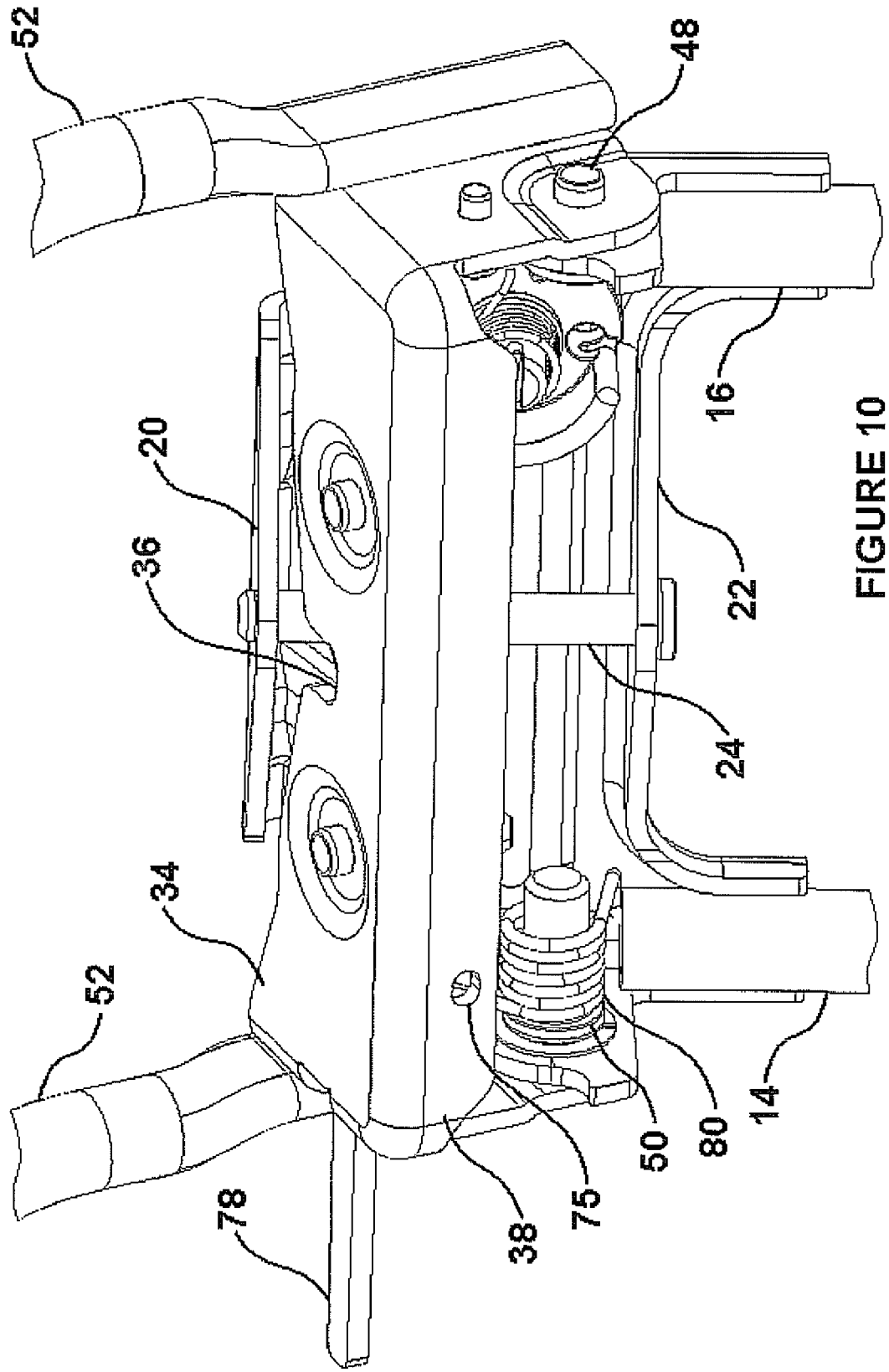
FIG. 10 is an illustration of the pivoting headrest bracket and bun supporting rod resulting from the release position established in FIG. 9.
Figure 11:
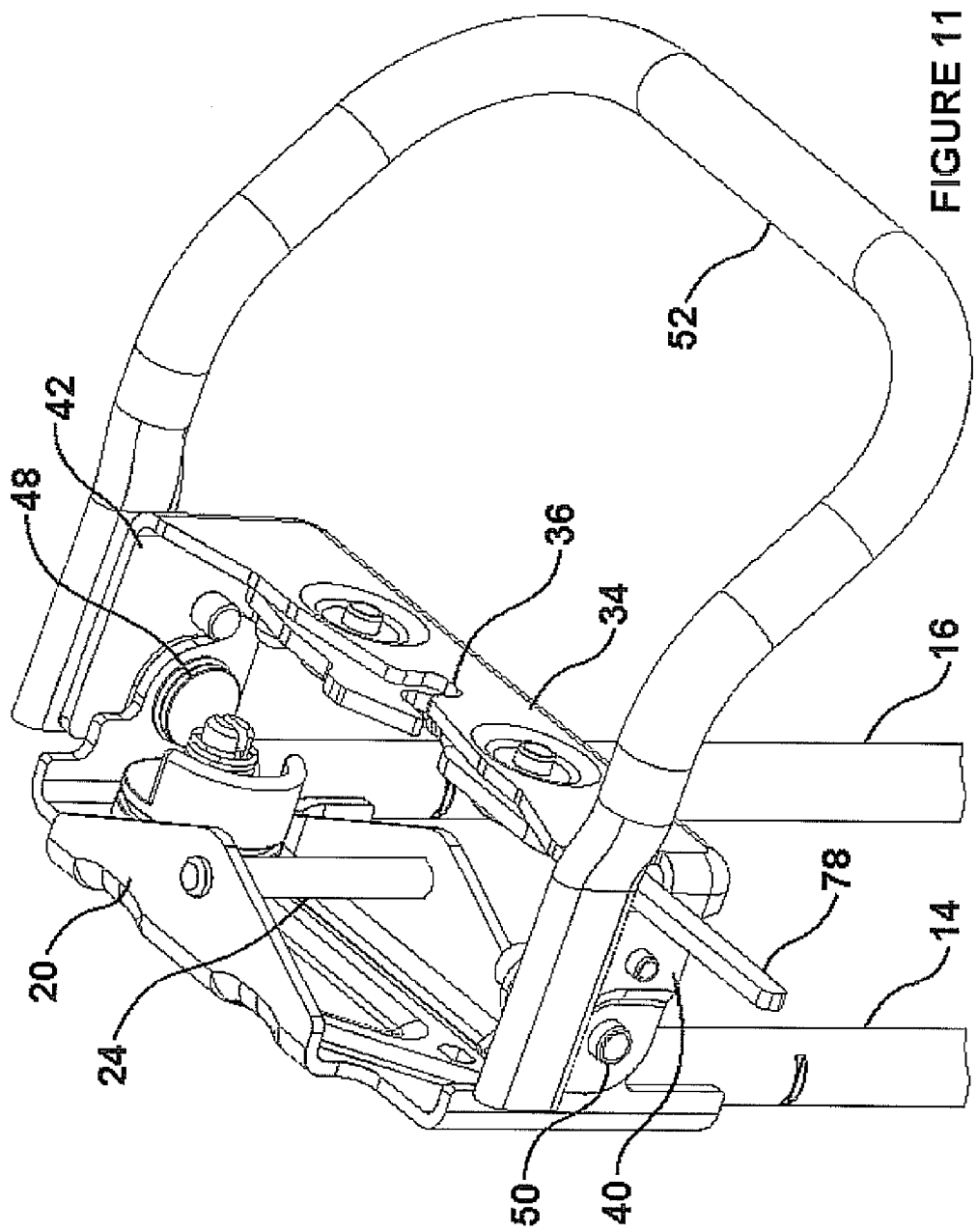
FIG. 11 is a successive illustration of the rotating bracket in a fully forward rotated position such as shown in FIG. 6.
Figure 12:
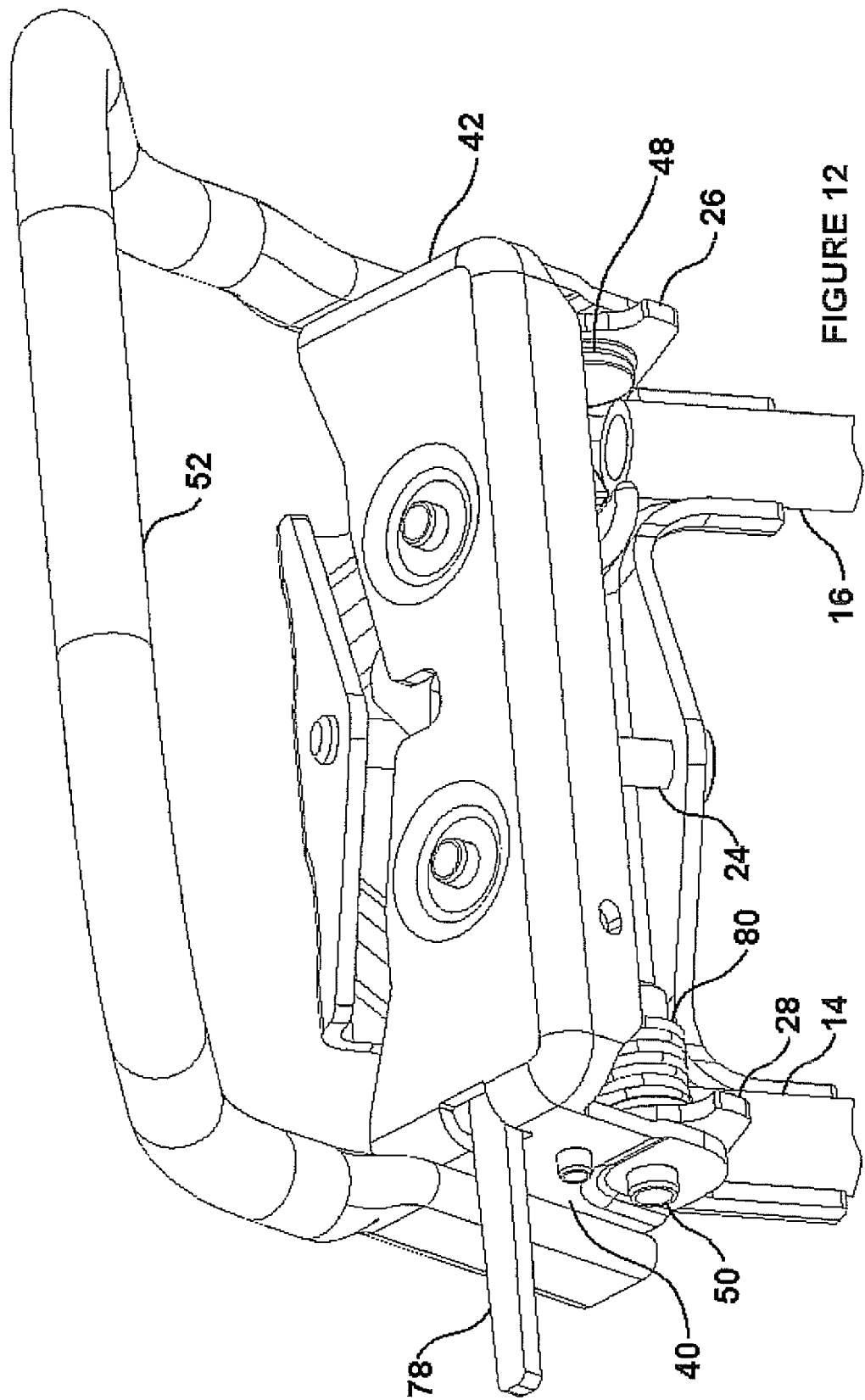
FIG. 12 is an illustration of a successive and reverse (manual) induced rotation of the pivoting headrest and illustrating the release plate in a pre re-engagement position relative to the fixed striker.

Upon being pivoted relative to the end fixed location 114, translation of the cable 112 around the redirection location 115 (see as shown between FIGS. 4 and 5) results in pulling actuation of the release element (wheel 88 as shown in the succession of views in FIGS. 7-9 and in particular in a rotary direction opposite to the coil spring bias direction as shown at 123 in FIG. 8) to separate the interiorly configured hook associated with the laterally displaceable plate 54 from biasing contact with the striker 24, with the result being that the second bracket 32 progressively pivots away from the first bracket 12 as further progressively shown in each of FIGS. 10-12.

Figure 13:
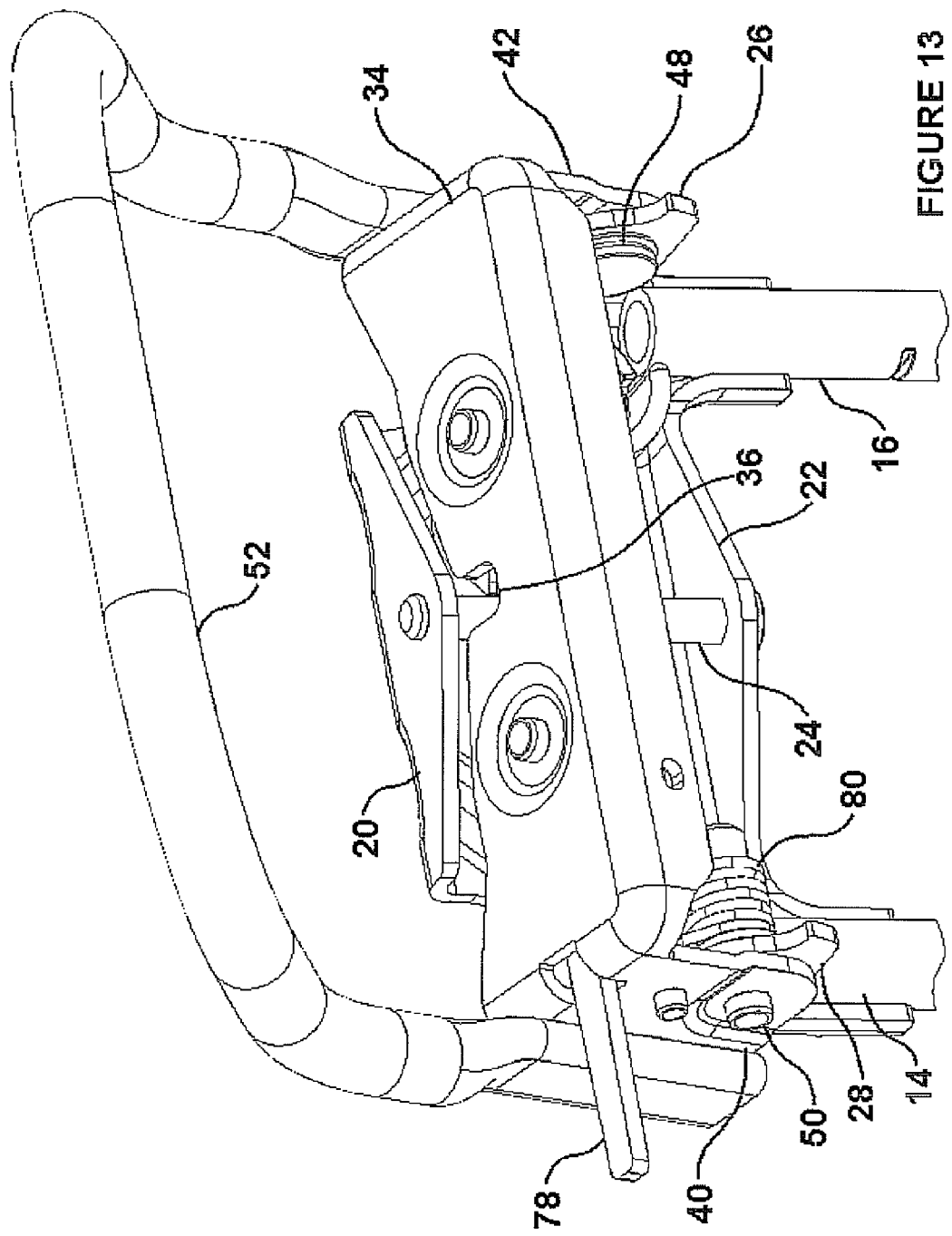
FIG. 13 is succeeding illustration to that shown in FIG. 12 and in which a further incremental upright reverse rotation of the headrest establishes a partial re-engagement with the release plate configured hook, this prior to reestablishing the upright design/engaged position of FIG. 7.

A return bias associated with the release element (i.e. the return bias rotation of the wheel 88 as influenced by the spring 98) results in progressive take-up of the slack in the cable 112, this concurrent with return pivoting of the second bracket 32 into engagement with the striker 24, and as further shown by the returning motion of the second bracket in FIGS. 12 and 13 and preliminary to a fully reseated and upright design position as shown in FIG. 7. Specifically, return motion of the pivoting headrest 32 is typically initiated by exerting a manual force on the headrest bun 54 and in which upright reverse rotation of the headrest establishes re-engagement with the release plate configured hook, along with progressively tacking up slack created in the cable 112 during upright return motion of the seatback 12, this prior to reestablishing the upright design/engaged position of FIG. 7.

Having described our invention, other additional preferred embodiments will become apparent to those skilled in the art to which it pertains, and without deviating from the scope of the appended claims.

We claim:

1. A pivoting headrest assembly incorporated into a rear row vehicle seat including a base and a pivotally supported seatback, said headrest assembly comprising:
   a first bracket fixedly supported atop the seatback and exhibiting a striker;
   a second bracket pivotally secured to said first bracket in a biased direction away from said striker, said second bracket further including an upwardly projecting headrest bun supporting profile;
   a hook supported upon said second bracket in a first biased direction engaging said striker;
   a release element supported upon said second bracket in a first biased direction and which, upon being actuated in a second counter-biased direction, being configured to engage a projecting portion associated with said hook, and
   a cable secured at a first end to a fixed location associated with the seat and extending through a redirection location an offset distance from a pivot location of said seatback, said cable securing at a second end to said release element;
   upon said seatback being pivoted relative to said fixed location, translation of said cable around said redirection location resulting in actuation of said release element to separate said hook from said striker and said second bracket to pivot away from said first bracket, a return bias associated with said release element resulting in take-up of slack in said cable concurrent with return pivoting of said second bracket into engagement with said striker.

2. The invention as described in claim 1, further comprising a clock spring supported upon a pivot pin established between said first and second brackets and having a first extending end biasing a surface location of said first bracket and a second extending end biasing a rivet secured to a side extending surface of said second bracket at a pivot offset location.

3. The invention as described in claim 2, said first bracket further comprising a pair of pivotal supporting sides, said second bracket further comprising a pair of outer extending and overlapping pivotal supporting sides which align over said first bracket sides, said pivot pin extending through a first pivotal aligning side, a secondary pivot pin extending through a second pivotal aligning side.

4. The invention as described in claim 1, further comprising a pair of support tubes extending upwardly from the seatback and supporting said first bracket therebetween, a pair of upper and lower flanges extending normally from said first bracket and supporting said striker in extending fashion therebetween.

5. The invention as described in claim 4, said cable extending through a hollow interior of a selected support tube prior to securing to said release element.

6. The invention as described in claim 1, said hook further comprising an interiorly apertured profile formed within a laterally displaceable and generally elongated plate supported against an underside of a width projecting ledge associated with said second bracket, said projecting portion extending downwardly from said plate.

7. The invention as described in claim 6, further comprising a coil spring having a first extending end secured to said laterally displaceable plate and a second extending end secured to said second bracket.

8. The invention as described in claim 6, said plate further comprising a pair of spaced apart and collinear extending slots defined therein and through which seats a pair of pins extending from said ledge.

9. The invention as described in claim 8, further comprising an edge projecting portion associated with said plate extending through a side aperture defined in said second bracket and which operates as a secondary and manually actuated release trigger independent from the actuating rotation of said seatback for pivoting said second bracket.

10. The invention as described in claim 6, said release element further comprising a generally wheel shaped and rotatable component supported upon a surface of said second bracket extending normal to said ledge.

11. The invention as described in claim 10, further comprising a modified clock spring seated over a support rivet associated with said rotatable component and including a first inner curled end seating within a keyed location of said rivet and a second outer extending end seating within an aperture formed in a surface of said rotatable component.

12. The invention as described in claim 10, further comprising an outwardly facing perimeter channel defined in said wheel seating said second end of said cable in winding fashion.

13. The invention as described in claim 10, further comprising a substantially semi-circular shaped projecting collar extending from an edge perimeter of said rotatable component and, upon said translating cable rotating said component, causing said collar to contact said projecting portion to laterally displace said plate against said bias.

14. A pivoting headrest assembly incorporated into a vehicle seat having a base and a pivotally supported seatback, comprising:
   a first bracket fixedly supported atop the seatback and exhibiting a striker;
   a second bracket pivotally secured to said first bracket in a biased direction away from said striker, said second bracket supporting a headrest bun;
   a hook supported upon said second bracket in a first biased direction engaging said striker;
   a release element supported upon said second bracket in a first biased direction and which, upon being actuated in a second counter-biased direction, being configured to engage a projecting portion associated with said hook, and
   a cable secured at a first end to a fixed location associated with the seat and at a second end to said release element;

upon said seatback being pivoted relative to said fixed location, translation of said cable resulting in actuation of said release element to separate said hook from said striker and said second bracket to pivot away from said first bracket, a return bias associated with said release element resulting in take-up of slack in said cable concurrent with return pivoting of said second bracket into engagement with said striker.

\* \* \* \* \*